(12) United States Patent
Aked

(10) Patent No.: US 10,305,786 B2
(45) Date of Patent: May 28, 2019

(54) DATA PROCESSING AND ANALYSIS SYSTEM AND METHOD

(71) Applicant: Maven Securities Holding Limited, London (GB)

(72) Inventor: Richard Aked, London (GB)

(73) Assignee: Maven Securities Holding Limited, London (GB)

(*) Notice: Subject to any disclaimer, the term of this patent is extended or adjusted under 35 U.S.C. 154(b) by 151 days.

(21) Appl. No.: 15/589,575

(22) Filed: May 8, 2017

(65) Prior Publication Data
US 2017/0310577 A1    Oct. 26, 2017

Related U.S. Application Data

(63) Continuation of application No. PCT/GB2015/053380, filed on Nov. 6, 2015.

(60) Provisional application No. 62/075,976, filed on Nov. 6, 2014.

(51) Int. Cl.
| | | |
|---|---|---|
| *G06F 9/48* | (2006.01) | |
| *G06Q 40/04* | (2012.01) | |
| *H04L 12/707* | (2013.01) | |

(52) U.S. Cl.
CPC ............ *H04L 45/22* (2013.01); *G06F 9/4881* (2013.01); *G06Q 40/04* (2013.01)

(58) Field of Classification Search
CPC ........ H04L 45/22; G06F 9/4881; G06Q 40/04
See application file for complete search history.

(56) References Cited

U.S. PATENT DOCUMENTS

| | | | | |
|---|---|---|---|---|
| 6,272,190 | B1 * | 8/2001 | Campana, Jr. ........... | H04B 7/10 375/347 |
| 8,363,744 | B2 * | 1/2013 | Agee .................... | H04B 7/0413 375/267 |
| 2006/0143454 | A1 * | 6/2006 | Walmsley ............... | G06F 21/85 713/170 |

(Continued)

OTHER PUBLICATIONS

PCT Notification of Transmittal of the International Search Report and the Written Opinion of the International Searching Authority, or the Declaration, dated Feb. 17, 2016, 11 pages.

(Continued)

*Primary Examiner* — Davoud A Zand
(74) *Attorney, Agent, or Firm* — Howard & Howard Attorneys PLLC

(57) ABSTRACT

A method of processing messages within a distributed computer system in order to compensate for latency effects within the distributed computer system, the distributed computer system comprising a plurality of user devices and a message processing device, the method comprising: receiving a message from a user device at a message management device; determining if the received message corresponds to a message type that requires compensation for latency delays; and, in the event that the message does not require compensation, forwarding the message to the message processing device; and, in the event that the message does require compensation for latency effects, calculating a randomized delay period, and holding the message at the message management device for the calculated delay period and subsequently forwarding the message to the message processing device.

17 Claims, 7 Drawing Sheets

(56) References Cited

U.S. PATENT DOCUMENTS

| | | | |
|---|---|---|---|
| 2006/0274112 A1* | 12/2006 | Jackson Pulver | B41J 2/04505 347/42 |
| 2006/0294312 A1* | 12/2006 | Walmsley | H04L 9/0662 711/122 |
| 2007/0019016 A1* | 1/2007 | Silverbrook | G06K 15/102 347/13 |
| 2007/0083491 A1* | 4/2007 | Walmsley | G06F 21/608 |
| 2008/0097887 A1 | 4/2008 | Duquette et al. | |
| 2008/0172321 A1 | 7/2008 | Bartko et al. | |
| 2014/0180889 A1 | 6/2014 | Rooney | |
| 2015/0127519 A1 | 5/2015 | Melton | |

OTHER PUBLICATIONS

Eva Szalay. "Randomisation allows smaller players to compete" in FX Week (online), May 30, 2014. https://www.fxweek.com/fx-week/news/2347290/randomisation-allows-smaller-players-to-compete.

Harris, Larry. "What to do about high-frequency trading." (2013). Financial Analysts Journal. https://www.cfapubs.org/doi/full/10.2469/faj.v69.n2.6.

* cited by examiner

DATA PROCESSING AND ANALYSIS SYSTEM AND METHOD

CROSS REFERENCE TO RELATED APPLICATION

This application is a continuation of PCT International Application No. PCT/GB2015/053380, filed Nov. 6, 2015, which claims the benefit of U.S. Provisional Patent Application Ser. No. 62/075,976, filed Nov. 6, 2014, the disclosure of which is hereby incorporated by reference in its entirety.

TECHNICAL FIELD

The present invention relates to a data processing and analysis system and method. In particular, the present invention relates to a system and method for mitigating latency issues between users of a computer network.

BACKGROUND OF THE INVENTION

In situations where messages are exchanged via a communications network, the speed at which those messages are delivered can be critical to their success.

For example, the speed at which transaction messages can be enacted in financial trading systems, particularly in high-frequency trading (HFT), is essential for ensuring that a profitable trade can be made, as will now be described below.

Trading venues exist to match the buy and sell orders of market participants in financial instruments (e.g. equities, bonds). Orders are submitted to an order-book. When a buy/sell order is submitted at an equal or higher/lower price than an outstanding (resting) sell/buy order, matching occurs and a trade is executed. An incoming order that will cause a trade to be executed is known as an aggressing order. Orders that cannot be matched immediately upon submission are left in the order book as resting orders and may be matched against future orders. Order books in liquid instruments are most commonly governed by price/time priority: buy/sell orders at higher/lower prices take priority and (when orders are at the same price) orders submitted earlier take priority. The administration of these processes at electronic trading venues is governed by a matching engine.

Investors commonly match their orders against a set of market participants who do not have a desire for an ongoing position (long or short) in the instrument, but who take the opposing position temporarily and seek to profit from the bid/ask spread; these participants are commonly referred to as market-makers.

If a market maker is willing to trade at a certain price level (all other things being equal), they have two options: submit a resting order to the order-book and wait to be matched, or wait for the opposing side to be entered and then aggress it.

The former gives the advantage of time-priority and may encourage an investor to enter an aggressing order as they can be confident of execution, but it carries the risk of being subject to latency arbitrage, also known as being 'picked off' or doing an 'unwanted trade', when another event causes the fair value of the instrument to change (e.g. price-sensitive news or a change in the price of a related instrument). This occurs when the participant is unable to process the event and submit their order amendment or cancellation as fast as another participant is able to process the event and submit an aggressing order. The time that a participant takes to respond to such events is known as latency.

Market-makers are therefore regularly picked-off by other high speed participants. To limit the cost and frequency of such pick-offs, the market makers therefore quote smaller and wider, reducing the displayed liquidity.

Based on the above-described system and method, the following problems are commonly-encountered in HFT systems:

1. Technological Arms Race: Those traders who make the most profit tend to be those with the fastest technology rather than necessarily being those with the best pricing algorithms. This slows price discovery and adds to instability in pricing. All market-makers are therefore forced to spend heavily on technology in order to keep up with each other. Some examples of techniques which are applied to reduce the latency of processing include the use of high performance networks/switches, overclocked machines, kernel bypass of network traffic, implementing all or part of the critical response path in FPGA hardware, and any associated tuning and optimization of the operating systems.

2. Barriers to Connection: Connecting to a new trading venue requires any latency-sensitive participant to build an optimised proprietary market link, rent co-located space and install optimised computers. These costs represent a barrier to entry for venues that wish to challenge incumbents as they require displayed liquidity from market makers in order to attract order flow from investors, however market-makers are unwilling to commit themselves to paying these connection costs without certainty that there will be sufficient order flow on the platform to recoup their costs.

It is therefore an object of the present invention to provide a system and method for addressing latency related issues in a multi-user computer network involving the exchange of time sensitive messages between users and a controlling computer device (e.g. a gateway).

It is against this background, and to overcome at least some of the above problems, that the present invention has been devised.

SUMMARY OF INVENTION

According to an aspect of the present invention, there is provided a method of processing messages within a distributed computer system in order to compensate for latency effects within the distributed computer system, the distributed computer system comprising a plurality of user devices and a message processing device, the method comprising: receiving a message from a user device at a message management device; determining if the received message corresponds to a message type that requires compensation for latency delays; and, in the event that the message does not require compensation, forwarding the message to the message processing device; and, in the event that the message does require compensation for latency effects, calculating a randomised delay period, and holding the message at the message management device for the calculated delay period and subsequently forwarding the message to the message processing device.

The present invention provides a method of processing messages within a distributed computer system in which latency effects within the system can have a detrimental effect on the functioning of the system. According to the aspect of the invention a randomised delay is applied to certain messages (those that require compensation for latency effects) and no delay is applied to other messages. Messages are received at a message management device within the distributed system, the message management device being arranged to determine if a given message requires compensation and to calculate the randomised delay period if the given message should be delayed. In the event of a delay being required, the message management device is further arranged to hold the given message until the randomised period is over after which the message is forwarded to its destination.

In prior art systems, the distributed computer systems have functioned on a First In-First Out principle, resulting in messages from the user device with the lowest latency always being forwarded to the message processing device first. This can result in increased spending and over-reliance on expensive technology that decreases the latency of a particular user device, in order to gain an advantage over the other users.

Advantageously, according to embodiments of the present invention, by applying a delay to certain message categories that require compensation for latency effects but not to other message categories, the above-described method ensures that messages with lower latency are not guaranteed to reach the message processing device before messages with greater latency. This method therefore effectively levels the playing field of all users of this system (in the context of the HFT example described above, the playing field is leveled by removing the ability to force a disadvantageous sale by having lower latency and thereby removing the incentive to invest in expensive latency-reducing technology).

Optionally the method comprises receiving latency related data relating to the distributed computer system, the latency related data comprising a latency value. Latency data may conveniently be received from a central server. Alternatively, a message management device user may set (input) latency related data into the message management device to enable the calculation of the randomised delay period.

Optionally, the method comprises receiving latency related data from each user device within the distributed computer system.

Optionally, the method may comprise, prior to receiving latency related data from each user device, sending a request to each user device to supply latency related data.

Optionally, the latency related data for each user device comprises a latency value.

It should be noted that the latency value may comprise or represent a time period or a response time that the user devices require to respond to input user commands.

Advantageously, the receipt of latency related data from the user devices allows the distributed computer system to tailor the range of delay periods that may be applied to incoming messages so as to always take into account the latency of each individual user device. This ensures a high degree of flexibility and adaptability when implementing the method in different distributed computer system.

Optionally, calculating the randomised delay period comprises setting a lower bound for the randomised delay period that is greater than or equal to the largest latency value in the received latency related data.

Optionally, calculating the randomised delay period comprises setting a lower bound for the randomised delay period that is greater than or equal to the average latency value in the received latency related data.

Optionally, calculating the randomised delay period comprises specifying a random number distribution having a variance greater than the latency values within the distributed computer system.

Advantageously, this ensures that the delay periods that are applied to incoming messages are large enough to take into account (and effectively compensate for) the intrinsic delay in messages submitted by the participant with the greatest latency. The overall latency for submission of messages by an individual user is therefore dominated by the larger random element rather than by the latency of the user's system.

Optionally, calculating the randomised delay period comprises calculating a randomised delay period according to a uniformly-randomised distribution.

Advantageously, this provides for a substantially equal outcome for a given high-low range of latency values, and allows the playing field to be substantially leveled.

Optionally, the distributed computer system comprises a financial trading platform for processing orders, the plurality of user devices comprise a plurality of participant servers, the message processing device comprises a matching order engine and the message management device is arranged to be located within a gateway, the participant servers, gateway and matching order engine being in communication with each other via a communications network.

Advantageously, the above-described method may be applied to financial trading platforms, and thereby minimises the risks of latency arbitrage—i.e. minimise the risk of one user being forced to carry out an unwanted or disadvantageous trade due to the latency of their device being greater than that of another user. This negates the advantage of investing in technological advances that provide the lowest latency possible, and curbs spending by users.

Optionally, the gateway comprises a delay randomiser module arranged to calculate the randomised delay period.

Optionally, the message comprises an order message.

Optionally, the method comprises applying the randomised delay period when the order message comprises a new order message or an amendment order message.

Optionally, the method comprises forwarding the order message without applying the randomised delay period when the order message comprises a cancellation message.

Advantageously, applying the randomised delay to the new order or amendment order messages but not to the cancellation messages ensures that a user will always be able to cancel their unwanted resting orders at the matching order engine (i.e. an order book) before another user is able to force a trade that is disadvantageous to the first user. This greatly reduces the risk of latency arbitrage and its associated disadvantages.

Optionally, the method comprises receiving a plurality of messages. The method may comprise sorting received messages into message type.

Advantageously, this ensures that all cancellation messages may be identified prior to transmission to the delay randomiser module, and transmitted directly from the gateway to the matching order engine without delay.

Optionally, the method comprises receiving a further message from a participant server that has previously sent a message and delaying the further message from the participant server until the previous message has been sent to the message processing device.

It should be noted that a system operating according to the above method will therefore delay orders in the same direction (per instrument, per participant) consecutively rather than concurrently. For example, a second buy order (from the same participant in the same instrument, but possibly with a different price and/or volume to the first order) will not begin its delay period until the first buy order has completed its delay period and been released to the matching engine. Advantageously this prevents participants from attempting to game the system by submitting multiple order messages and cancelling all outstanding ones as soon as one order message reached the matching order engine.

Optionally, the method comprises sorting received messages in dependence on the identity of the sending participant server.

According to another aspect of the present invention, there is provided a non-transitory computer readable storage medium comprising computer readable instructions for a computer processor to carry out the method as described above.

According to a further aspect of the present invention, there is provided a system for processing messages within a distributed computer system in order to compensate for latency delays, the distributed computer system comprising a plurality of user devices and a message processing device, the system comprising: an input arranged to receive a message from a user device and a message management device arranged to determine if the received message corresponds to a message type requiring compensation for latency effects, wherein (i) in the event that the message does not require compensation, an output is arranged to forward the message to the message processing device; and, (ii) in the event that the message does require compensation for latency effects, the message management device is arranged to: calculate a randomised delay period and hold the message at the message management device for the calculated delay period, the output being subsequently arranged to forward the message to the message processing device.

It should be appreciated that the advantages associated with the method of the present invention are equally applicable to the system of the present invention.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

Figure 1:
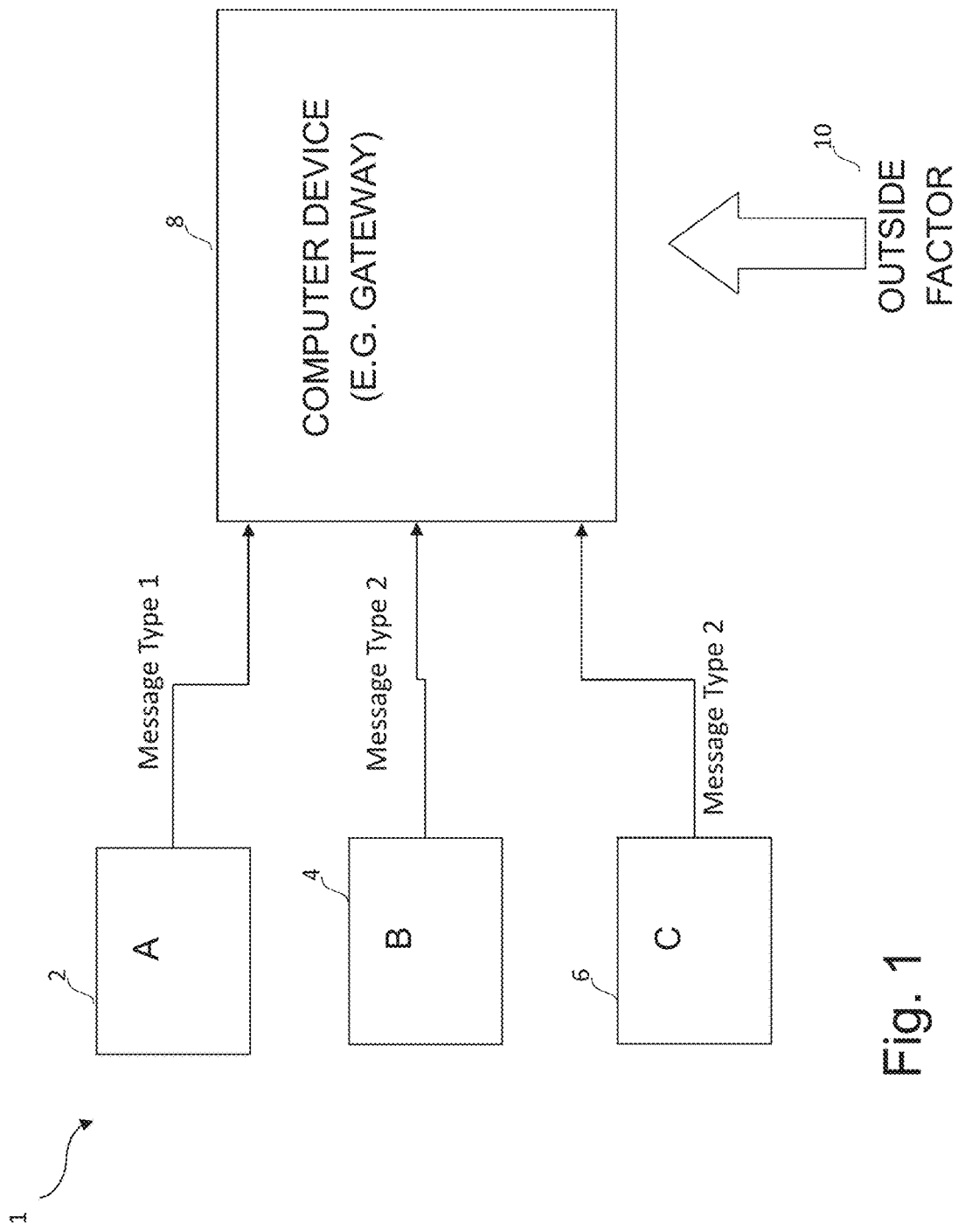
FIG. 1 is a schematic block diagram of a part of a data handling system carrying out processing and analysis of data, according to an embodiment of the present invention.

Where the figures laid out herein illustrate embodiments of the present invention, these should not be construed as limiting to the scope of the invention. Where appropriate, like reference numerals will be used in different figures to relate to the same structural features of the illustrated embodiments.

DETAILED DESCRIPTION OF THE INVENTION

FIG. 1 illustrates a portion of a data handling system 1 which carries out processing and analysis of data, in accordance with an embodiment of the present invention and which is useful for understanding the context of the present invention.

This system portion comprises a plurality of user devices 2, 4, 6 (labelled 'A', 'B' and 'C'), which submit messages to a computer device 8 (for example, a gateway). These messages comprise two different types (Type I and Type II), and the type of message that is submitted is dependent on the outcome which the users wish to achieve. In addition, each user device 2, 4, 6 has a particular latency associated with it (i.e. the time taken by the device to respond to an external event or "Outside Factor" 10 and transmit a message to the computer device 8). Therefore, the order in which messages will reach the computer device 8, and therefore the order in which the messages are processed, is determined by the latency of the user devices 2, 4, 6. This introduces a natural imbalance in the ability of users to respond to external events.

An example of a scenario in which the above system may operate is one in which a particular product is advertised for sale, such that the price of the product is dependent on certain external factors (such as oil price, for example). In this scenario, user A has previously advertised a price that they were willing to sell the product at, however due to external events (e.g. a change in the oil price) the price at which user A originally advertised the product for sale is no longer advantageous to A. User A therefore attempts to submit a message to the computer device 8 to prevent the sale of the product (Type 1 message). Simultaneously, users B and C have also registered the effects of the external event and submit messages to the computer device 8 (Type 2 messages) attempting to purchase the product before A can prevent them from doing so. If the devices used by users B or C have lower latency than that used by user A, user A will not be able to prevent a disadvantageous sale. It should be noted that even if users A, B and C all have the same average response time, the disadvantageous sale will still occur in two thirds of instances, due to network jitter which introduces a small (but noticeable) randomisation effect.

Figure 2:
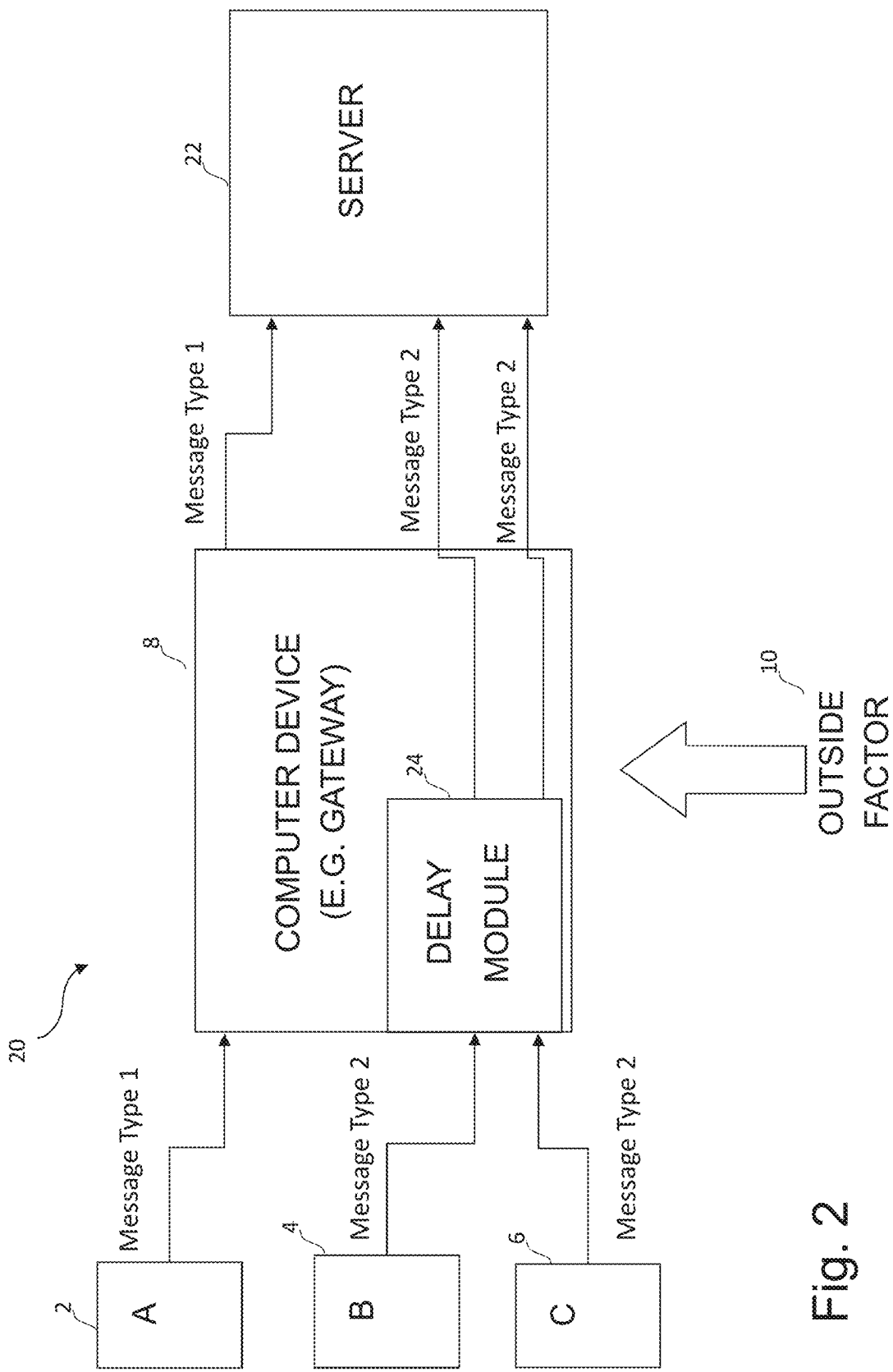
FIG. 2 is a schematic block diagram of the data handling system of FIG. 1, incorporated into a general system environment, in accordance with an embodiment of the present invention.

FIG. 2 shows the incorporation of the system portion 1 of FIG. 1 into a generalised system environment 20, in accordance with an embodiment of the present invention and in order to provide an overview of the present invention and to illustrate the context in which embodiments of the present invention may be applied.

In addition to the plurality of user devices 2, 4, 6 and the computer device 8, the system 20 also comprises a server 22 which is in operative communication with the computer device 8. The messages submitted by the users to the computer device 8 are subsequently transmitted to the server 22. The computer device 8 further comprises a delay module 24, which is arranged to apply a delay to certain types of messages. Specifically, Type 2 messages enter the delay module 24 and have a delay applied to them, whereas Type 1 messages do not enter the delay module 24 and are transmitted directly to the server 22 upon receipt by the computer device 8.

In the context of the above FIG. 2, as the Type 2 messages from users B and C enter the delay module and are subsequently delayed, this allows the Type 1 message from user A to reach the server first—user A may therefore prevent a disadvantageous sale even if the latency of his device 2 would otherwise have prevented him from being able to do so.

The prior art system of FIG. 3 and the embodiments of the invention of FIGS. 4-7 are described below in the context of financial systems. It should be appreciated however that embodiments of the present invention may be applied to other technical fields in which categories of time sensitive messages are exchanged between users and a gateway/computer/server. For example, embodiments of the present invention may be used in gaming environments (e.g. in real-time online multi-player games) where the latency of a particular participant's device/server affects his ability to respond to events that occur within the gaming environment. For example, in a two-player combat type game, where messages submitted by Player 1 are subject to lesser latency than messages submitted by Player 2. In this scenario, the reduced latency of Player 1's system in comparison with that of Player 2's system may result in the host game server receiving and responding to Player 1's messages before receipt of Player 2's messages. Therefore, if Player 1 is attempting to shoot Player 2 and the former submits a 'Fire' message whilst the latter submits a 'Avoid' message, the latency associated with Player 1's system results in a higher probability of Player 2 being struck by Player 1's shots, thereby giving Player 1 an unfair advantage in the game.

It should also be appreciated that the systems and processes disclosed herein would also be relevant for other practical applications of queuing theory, such as network protocols for the exchange of data over a communication network, and the following portions of this specification should be read in light of this wider field of applicability.

Figure 3:
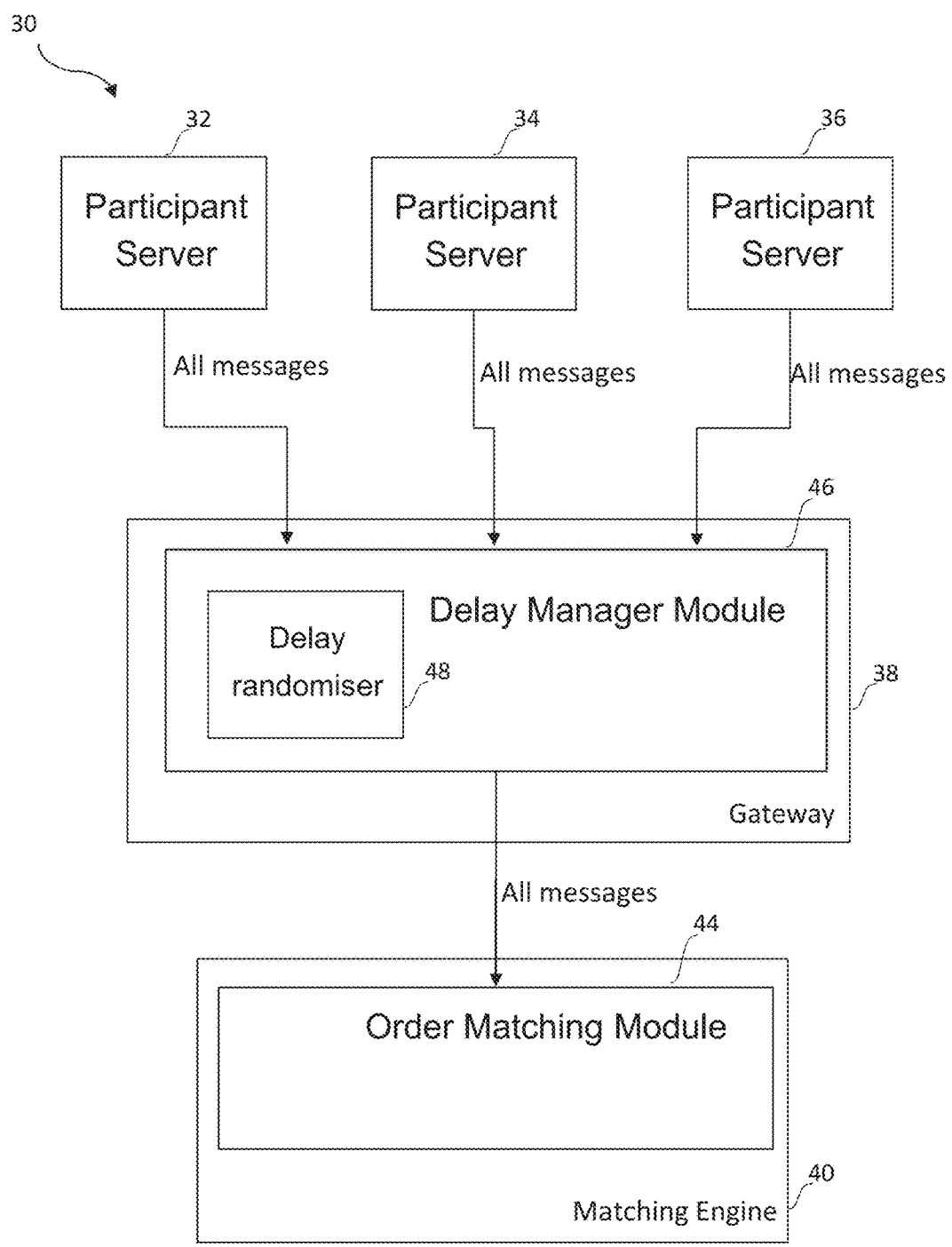
FIG. 3 is a schematic block diagram of a known data handling system carrying out processing and analysis of data. The prior art system illustrated in this figure is presented for comparison with embodiments of the present invention, as described below with reference to FIGS. 4, 5, 6 and 7.

FIG. 3 illustrates a known (prior art) data handling system 30 which is currently used to process and analyse financial data. Examples of current trading platforms implementing such a system exist in the foreign exchange market.

This data handling system 30 comprises a plurality of participant servers 32, 34, 36, a gateway 38 and a matching engine 40. Order messages are submitted by the participant servers 32, 34, 36 via the gateway 38 to the matching engine 40. The matching engine 40 further comprises an order matching module 44, where the order messages are matched against existing (resting) orders or added to an order book. The gateway 38 further comprises a delay manager module 46, itself comprising a delay randomiser 48 which applies a uniformly-randomised delay to every incoming order message, such that it is retained at the gateway 38 for a certain time before being released to the matching engine 40. Where the delay is larger than the average latency of the participants, the overall latency is dominated by the larger random element introduced by the delay rather than the latency of the participant systems. This has the effect of altering the order in which the received order messages are released to the matching engine 40 (rather than relying on a simple First-In First-Out mechanism). Participants with the lowest latency are no longer guaranteed to be rewarded with the most profitable transactions and therefore there is less incentive to spend on faster technology.

This may be illustrated in the following example where Participant A has a latency of 1 millisecond (ms) and Participant B has a latency of 1 microsecond (µs). On a normal platform without a randomised delay, B beats A every time. But if a uniformly distributed randomised delay of 50-100 ms is added to all messages, A's total latency is uniformly distributed from 51-101 ms and B's from 50.001-100.001 ms, meaning that B will only beat A 51.998% of the time. This is an insignificant advantage and would not justify anything close to the existing levels of expenditure on trading speed. Note that the delay must be randomised or else, with a fixed delay of 100 ms every time, A's overall latency would be 101 ms and B's 100.001 ms, so B would win 100% of the time.

However, this mechanism does not remove the possibility of latency arbitrage. If participant B has a resting offer in and the price of a related instrument jumps up, B may wish to cancel and A may try to buy the order. As a randomised delay is added to both cancellations as well as new orders, A will succeed 48.002% of the time, leaving B with an unwanted trade at a mark-to-market loss. Although the re-distribution of profits due to latency arbitrage is now more even across participants, it still poses a risk that market makers can reduce by quoting smaller and wider, and therefore does not solve the problem of reduced displayed liquidity.

Other known systems implement a similar arrangement, however in such arrangements, a randomised delay of at least 3 ms is only applied to aggressing order messages (i.e. those that will cause a trade to be executed). All other order messages are allowed to pass straight through in order of receipt, and therefore the speed in updating/inserting non-aggressing orders is still rewarded with preferential priority. Such systems therefore do not solve the problem of the technological arms race.

The fast propagation of price changes does have benefits where it impacts upon investment decisions and improves the efficiency of capital allocations, however, these days where latencies can be under 1 microsecond in some cases and under tens of milliseconds in almost all cases, it is inarguable that there would be any discernible change in human decision-making. There is therefore no net benefit (to the market as a whole) from this spending on greater speed and the costs imposed must ultimately be passed to investors in the form of higher execution costs FIG. 4 illustrates a data handling system 50 for processing and analysing financial data according to an embodiment of the present invention.

Figure 4:
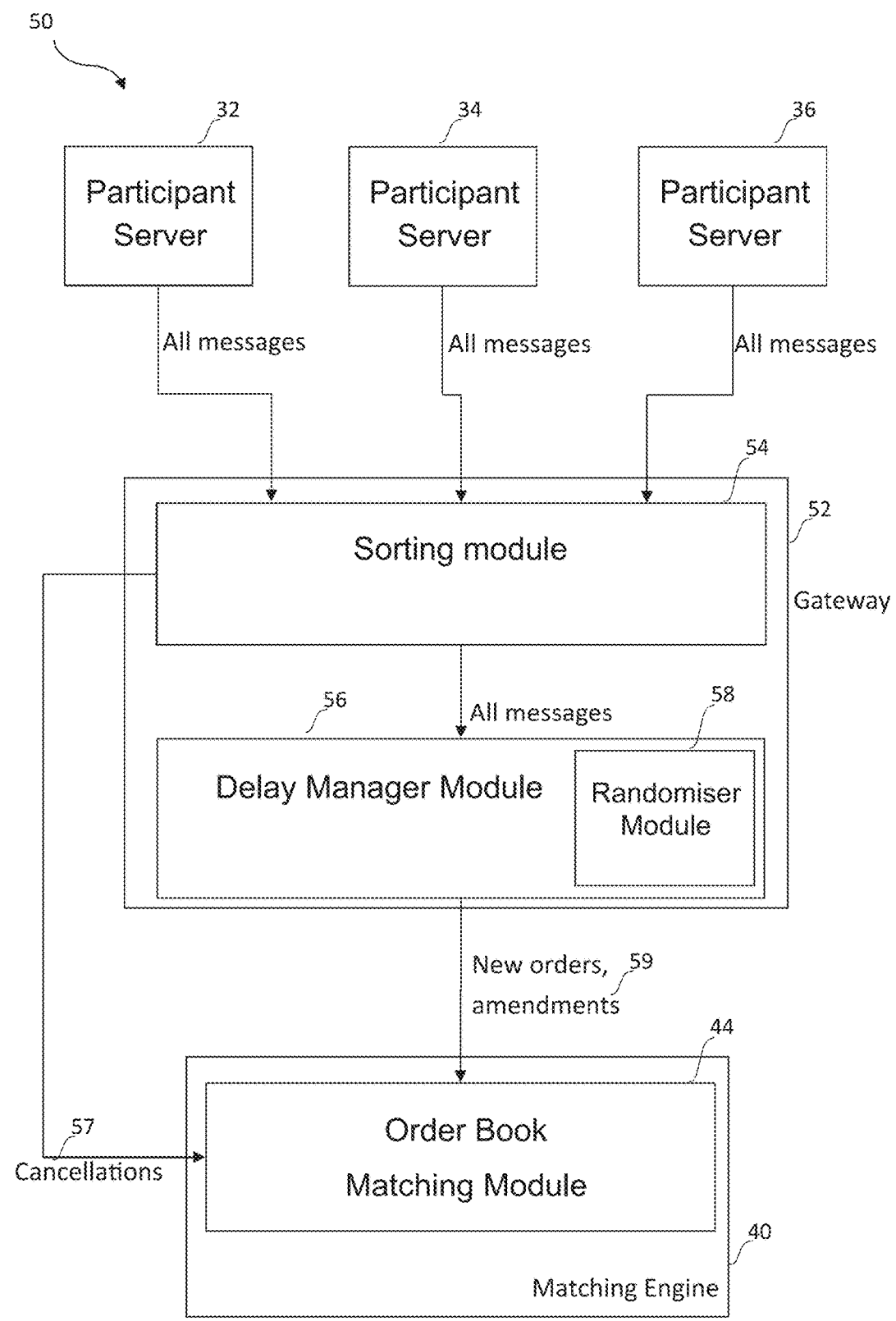
FIG. 4 is a schematic block diagram of a data handling system carrying out processing and analysis of data in accordance with an embodiment of the present invention.

As with the known arrangement presented in FIG. 3, the data handling system 50 of FIG. 4 comprises a plurality of participant servers 32, 34, 36 (e.g. servers operated by investors and market makers), a (trading venue) gateway 52 and a matching engine 40. The participant servers 32, 34, 36 are in operative communication with the gateway 52 (e.g. via a communications network) and order messages are transmitted to the gateway 52; the order messages are processed in the gateway 52 and may subsequently be transmitted to the matching engine 40. The matching engine 40 further comprises an order book matching module 44, which is programmed with instructions to carry out a matching process between order messages which have been retained in the order book matching module 44 and incoming order messages.

The gateway 52 further comprises a sorting module 54 and a delay manager module 56. All incoming order messages from the participant servers 32, 34, 36 are sorted by the sorting module 54 into different categories depending on the properties of the message and the type of command input. Certain pre-determined categories of order messages 57 corresponding to particular data commands (referred to as 'cancellations') are transmitted directly to the order book matching module 44. All order messages are subsequently transmitted to the delay manager module 56.

The delay manager module 56 further comprises a randomiser module 58 arranged to apply a randomised delay only to certain types of incoming order message categories 59 (referred to as 'new orders' and 'amendments'), such that these particular incoming order messages are retained in the gateway 52 for a period of time before being transmitted to the matching engine 40. The randomiser module 58 may comprise a processor (not shown) programmed with instructions to generate a pseudo-random number distribution with a lower limit corresponding to the response time achievable with readily available and inexpensive technology (e.g. 25 ms), and an upper limit corresponding to a pre-determined delay time set at a level whereby the range between the upper and lower limits is an order of magnitude larger than the differences between the latencies of competing fast participants. The variance of the pseudo-random number distribution should therefore be large enough to dwarf all differences in response times between participant servers, and therefore nullify any advantage that is gained by having high speed technology.

It will be appreciated by the skilled person that up to the point at which order messages are transmitted to the delay manager module 56, the processing of order messages by the system 50 follows a First-In First-Out procedure. However, once the order messages are transmitted to the delay manager module 56, as a randomised delay time is added to each order message, the order messages are thereby placed in a queue to await transmission to the matching engine 40, and therefore the order in which the order messages are subsequently released to the matching engine 40 is different to that in which they were received by the gateway 52.

In addition to applying delays to (and thereby retaining) new orders and amendments 59, the delay manager module 56 is also programmed to process the incoming order messages and determine if any of the data commands comprised within the cancellation messages 57 correspond to any of the new orders or amendments. If a match is found, the delay manager module 56 is further programmed to carry out a match between the two order messages in situ—the cancellation command is applied to the corresponding new order/amendment message and both order messages are thereby deleted (i.e. neither message is transmitted to the matching engine). In some embodiments, any cancellation messages 57 which are not matched within the delay manager module 56 are also removed from the queue, as they have already been transmitted to the matching engine 40 from the sorting module 54.

It will be appreciated that in some embodiments, for ease of programming the system a randomised delay may also be applied to the cancellation messages 57 as well as the new orders and amendments 59. This application of a randomised delay to the cancellation messages 57 within the delay manager module 56 will not affect the desired outcome of the system—to ensure that a first participant is always able to cancel an order message, which has been retained at the order book matching module 44, before a second participant can submit an order message to the order book matching module 44 and force a trade which is disadvantageous to the first participant—as the cancellation messages 57 will always be transmitted from the sorting module 54 to the order book matching module 44 without the application of any additional delay.

It should also be appreciated that the result obtained using the delay manager module 56 is not dependent on the exact form of the distribution used to generate the delay times—the use of either a uniform distribution or a non-uniform distribution of possible delay times could produce a similar result (although the use of a non-uniform distribution may be slightly less efficient).

Additionally, it is to be appreciated that the delay management process may be implemented at any point after the data messages and commands are transmitted to a gateway 52, and prior to their analysis in the matching engine 40. Therefore, the exact placement of the randomiser module 58 (whether before or after other processes in the order cycle such as pre-trade risk controls) should not be construed as limiting.

Figure 5:
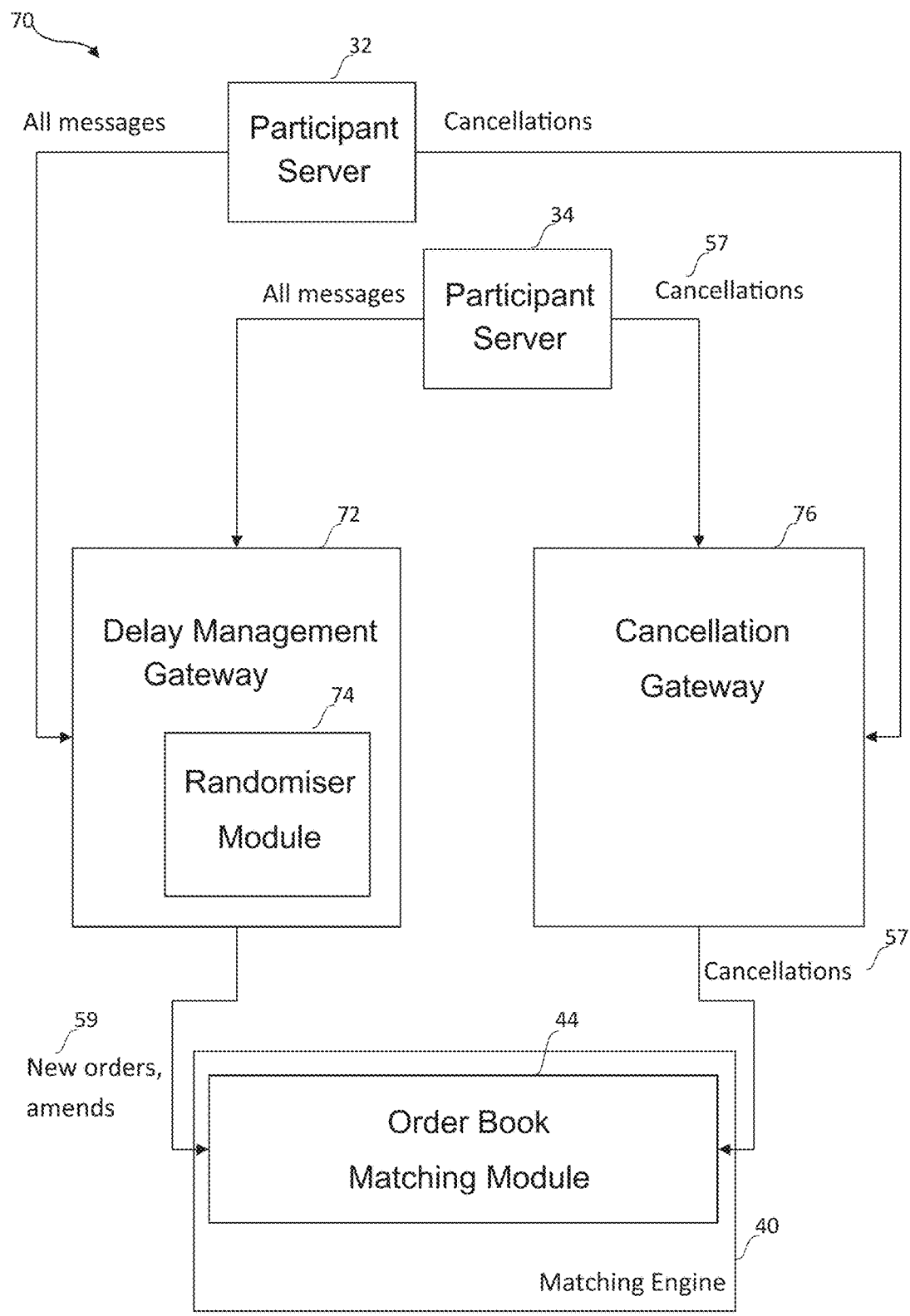
FIG. 5 is a schematic block diagram of a data handling system carrying out processing and analysis of data in accordance with another embodiment of the present invention.

FIG. 5 illustrates a data handling system 70 for processing and analysing financial data according to an alternative embodiment of the present invention.

By comparison with the previous system embodiment 50, this system 70 comprises two gateways—a delay management gateway 72 (further comprising a randomiser module 74) and a cancellation gateway 76. Each participant server 32, 34 is in operative communication with both gateways 72, 76, and the two gateways 72, 76 carry out separate processes (in parallel) on the incoming order messages received from the participant servers 32, 34, before transmitting these messages to the order book matching module 44 in the matching engine 40.

Specifically, all cancellation messages 57 submitted by a participant server 32, 34 are sent to the cancellation gateway 76, and are then transmitted directly to the matching engine 40 without applying any delay. All other messages are sent to the delay management gateway 72, where the randomiser module 74 applies a randomised delay to the incoming order messages in substantially the same manner as described above (with reference to FIG. 4).

In this embodiment, it is preferable for cancellations to also be submitted to the delay management gateway 72 to ensure that all the cancellations are achieved immediately (as highlighted in FIG. 5 by the term "all messages" between the servers 32, 34 and the gateway 72 which indicates that the cancellation messages in addition to the other messages are sent to the gateway). This is to prevent the following situation from occurring: in the event that a cancellation is only sent to the cancellation gateway 76, and a data command is transmitted to the matching engine 40 after the cancellation command reaches the matching engine 40, a match will not be made and the data command is therefore not cancelled. If, however, the cancellation command was also sent to the delay management gateway 72, it would intercept the delayed data command and cancel it in situ. The sending of cancellation commands to both gateways 72, 76 is particularly preferable in the event of limited storage at the matching engine 40, as unmatched cancellation commands would be deleted immediately in such a system, and participants could run the risk of not having their data commands cancelled, without being aware of it.

These embodiments are for illustrative purposes only, and should not be construed as limiting. Alternative embodiments are envisaged in which multiple gateways or cancellation gateways may be connected to a single matching engine. Other embodiments are also envisaged wherein one or more participants may be connected to a single gateway or a single cancellation gateway.

The system embodiments of FIGS. 4 and 5 provide a single solution to both problems encountered in the prior art, and which had previously only been solved individually. The solution provided by the systems in the present application is to only apply delays to a subset of incoming data messages, namely those that do not involve a cancellation command. This has the effect of negating the dependence, of the ability to enact commands, on the latency period of a particular system (taking into account both the latencies of a single Participant's Server, as well as the latencies across a network which transmits data over large distances). This solution also ensures that cancellation commands may be enacted before any other commands (i.e. a participant is able to cancel/remove their data before another participant is able to gain access to it, if so desired).

Figure 6:
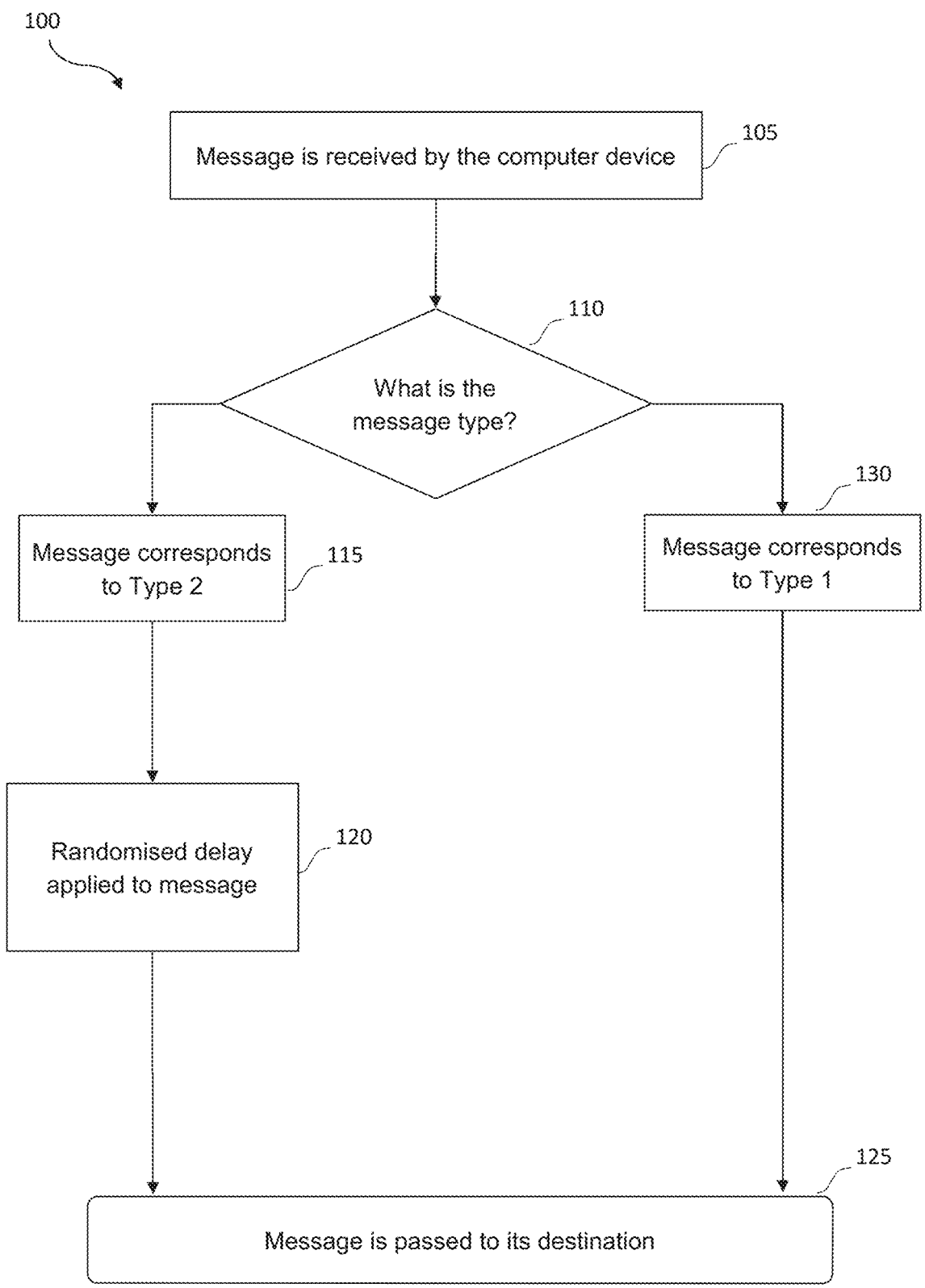
FIG. 6 is a flow diagram of a high-level process comprising the processing and analysis of data in accordance with the system embodiment of FIG. 2.
Figure 7:
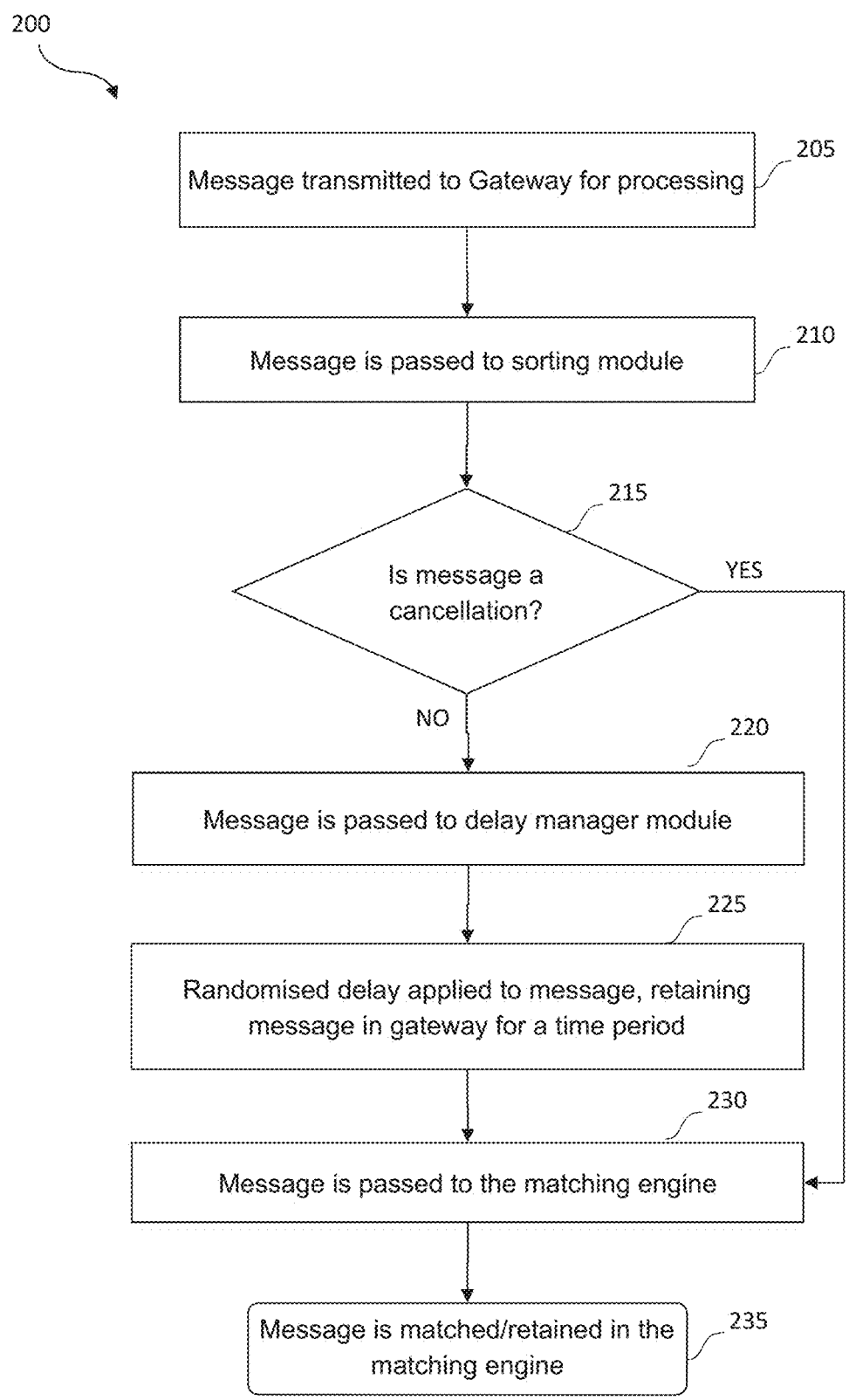
FIG. 7 is a flow diagram of a high-level process comprising the processing and analysis of data in accordance with the system embodiment of FIG. 4.

The flow chart of FIG. 6 shows how a message received by the computer device 8 of FIG. 1 or 2 would be processed in a general application-independent context, while the flow chart of FIG. 7 describes the same process in the context of financial systems, and utilising the system embodiment of FIG. 4.

In the general system embodiser of the present invention illustrated in FIG. 6, the process 100 begins at Step 105 when incoming messages are received by the computer device 8 and are then analysed at Step 110 to determine the message type—i.e. whether the message corresponds to a Type 1 or a Type 2 message. If it is determined at Step 115 that the message corresponds to a Type 2 message, a randomised delay is applied at Step 120 and the message is only transmitted to its intended destination at Step 125 after the delay period has expired; if it is determined at Step 130 that the message corresponds to a Type 1 message, the process proceeds to Step 125 and the message is transmitted directly to its intended destination with no further delay applied.

In the financial context embodiment illustrated in FIG. 7, the process 200 begins at Step 205 when incoming order messages are transmitted from the participant servers 32, 34, 36 to the gateway 52 for processing. Upon entering the gateway 52, each order message is passed at Step 210 to the sorting module 54, which analyses the data commands contained within the message and determines at Step 215 the category of the received message (i.e. whether the message corresponds to a cancellation).

If it is determined at Step 215 that the message is not a cancellation (i.e. it corresponds to a new order or an amendment), it is transmitted directly at Step 220 to the delay manager module 56. The randomiser module 58 comprised within the delay manager module 56 then determines at Step 225 a delay period to be applied to the message, and the message is retained within the gateway 52 for the entirety of the delay period. Once the delay period has ended, the message is passed at Step 230 to the matching engine 40 where it is at Step 235 either matched against an existing order (previously submitted and retained) or it is retained for future matching.

If it is determined at Step 215 that the message is a cancellation, the process proceeds directly to Step 230: the message is passed at Step 230 directly to the matching engine 40 and the data commands within the message are carried out at Step 235 to cancel an existing message within the matching engine.

In some embodiments, if the message is a cancellation, in addition to being transmitted directly to the matching engine 40, the message is also passed to the delay manager module 56. However, unlike the other message categories, no delay is applied to the cancellation messages 57; instead, the delay manager module 56 determines if the data commands in the cancellation message may be enacted on any messages currently retained within the delay manager module 56 (for example, a cancellation intended for a new order or amendment message for which the delay period has not expired). Any cancellation messages that are not enacted in situ at the delay manager module 56 are deleted.

A potential way that participants might seek to game this system, and increase their chances of submitting an order that reaches the matching engine 40 sooner than their competitors, would be to submit multiple identical orders and cancel all those that are outstanding as soon as one reaches the matching engine 40.

To prevent this, alternative or additional embodiments have also been envisaged which comprise delaying orders in the same direction (per instrument, per participant) consecutively rather than concurrently. For example, a second buy order (from the same participant in the same instrument, but possibly with a different price and/or volume to the first order) will not begin its delay period until the first buy order has completed its delay period and been released to the matching engine 40.

In one such embodiment, the delay manager module 56 may comprise an additional sorting module (not shown), which ranks the incoming data based on the user's details and details of the submission (i.e. the time stamp associated with the submission of the order). The delays may be applied to each incoming order based on their rank order (i.e. each order only begins its delay period after the previous order has completed its delay period and has been sent to the matching engine 40).

In these embodiments, the routing of cancellation messages to the delay manager module 56 as well as the matching engine 40 (as previously described) is advantageous, as this would allow a user to avoid queuing (if they choose) by effecting immediate cancellations of delayed/queued orders. If cancellations were routed only to the matching engine 40 and not the delay manager module 56, this queuing of orders could result in excessive delays to the prices in the order-book being renewed when a liquidity provider's prices update and the prices of those orders become stale (i.e. due for cancellation before reaching the order book matching module 44).

In some embodiments, the system may be arranged to support a 'tiered quoting system', allowing market makers specify multiple tiered 'child' orders derived from the price and volume from a single bid/ask 'parent' orders. For example, a child order could be specified as: price=parent_bid_price*99.9%; volume=parent_bid_volume*150%. In such embodiments, the child orders may then be updated using a single order message, which will be subject to a single overall delay. In such embodiments, it is immaterial whether the parent order is displayed.

The tiered quoting system is advantageous as it prevents an increase in the time taken for a market-maker displaying liquidity under a 'tiered quoting system' to re-insert their quotes following a cancellation. The market-maker is therefore able to choose to display liquidity at multiple price levels, and has the ability to adjust the size of the displayed orders depending on the number of levels against which an aggressing order is executed. For example, the number of layers, their spacing and the volume multipliers at each layer would be configurable by the participant for each instrument.

It should be noted that this approach could be applied to an order-book that hosts 'lit' (i.e. order visible pre-trade) or 'dark' (i.e. orders which are not visible pre-trade and which may also include conditions not to match them unless they can be matched in full) trading, or to one that hosts both.

Additional or alternative embodiments have also been envisaged which fall within the scope of the present invention. In one such embodiment, the system may ban or prevent the sending of duplicative orders where it is not the intention to trade upon all of them. This would have the advantage of preventing users from gaming the system (if policed rigorously), but would involve additional effort compared to queuing similar orders consecutively. In particular, the system will be required to determine fairly and accurately when an abusively duplicative order had been sent, which is unlikely to be straightforward in all cases.

In some embodiments, it is envisaged that only a subset of cancellations may be transmitted directly to the matching engine 40 from the gateway 52 (i.e. allow immediate cancellation of certain orders only). The remainder of the cancellations will be treated the same as the other categories of messages—the randomiser module 58 will apply a randomised delay to these cancellation messages and retain them in the delay manager module 56 before passing them to the matching engine 40.

For example, immediate cancellation may be granted only to specific types of resting order e.g. 'quote type' orders, or orders sent by operator-designated 'market-makers' or 'liquidity-providers'. As these sorts of orders form the bulk of displayed liquidity in some instruments the end-result as observed by users of the system would be similar. Limiting the immediate cancellations to these order types would not necessarily affect the market structure, but the algorithm required to implement the method of the present invention may be more easily incorporated into some legacy systems With no risk of being picked off, market-makers will display quotes in larger volume and/or at a tighter spread. This allows price-takers to get immediate execution in greater size and/or at better prices. This reduces execution costs for investors and should allow the venue operating such a system to attract business ahead of venues operating the currently dominant systems.

Because there is a greatly diminished advantage to participants from building very fast systems and, similarly but more importantly, little disadvantage from not building them, participants will be able to connect to the venue and compete on a level playing field without making the significant investments in proprietary market links that are currently required to be competitive on most trading platforms. This would present a venue operating such a system with a second competitive advantage over the incumbent systems.

Many modifications may be made to the above embodiments without departing from the scope of the present invention as defined in the accompanying claims.

What is claimed is:

1. A computer system for processing messages in order to compensate for latency delays, the computer system comprising:
    an input arranged to receive messages from a plurality of server devices; and,
    a message management computer device coupled to the input and having:
        a first processor for sorting received messages into a first category of message type that do not require compensation for latency effects and a second category of message type that does require compensation for latency effects; and
        a second processor arranged to apply a randomised delay to messages transmitted from the first processor to the second processor; and
    first and second outputs arranged to output messages to a message processing device
    wherein, for each received message, the first processor is arranged to determine the category of message type of the received message and
    (i) in the event that the received message is determined to be in the first category, the first processor is arranged to transmit the received message to the message processing device via the first output; and,
    (ii) in the event that the message is determined to be in the second category, the first processor is arranged to transmit the received message to the second processor and the second processor arranged to: calculate a randomised delay period and hold the received message for the calculated delay period and to subsequently, transmit the received message to the message processing device via the second output.

2. The system as claimed in claim 1, wherein the input is arranged to receive latency related data relating to the computer system, the latency related data comprising a latency value.

3. The system as claimed in claim 1, wherein the input is arranged to receive latency related data from each server device.

4. The system as claimed in claim 3, further comprising an output, and wherein prior to receiving latency related data from each server device, the output is arranged to send a request to each server device to supply latency related data.

5. The system as claimed in claim 3, wherein the latency related data for each server device comprises a latency value.

6. The system as claimed in claim 2, wherein the second processor is arranged to calculate the randomised delay period by setting a lower bound for the randomised delay period that is greater than or equal to the largest latency value in the received latency related data.

7. The system as claimed in claim 2, wherein the second processor is arranged to calculate the randomised delay period by setting a lower bound for the randomised delay period that is greater than or equal to the average latency value in the received latency related data.

8. The system as claimed in claim 2, wherein the second processor is arranged to calculate the randomised delay period by specifying a random number distribution having a variance greater the latency values within the computer system.

9. The system as claimed in claim 1, wherein the second processor is arranged to calculate the randomised delay period by calculating a randomised delay period according to a uniformly-randomised distribution.

10. The system as claimed in claim 1, wherein the computer system comprises a financial trading platform for processing orders, the plurality of server devices comprise a plurality of participant servers, the message processing device comprises a matching order engine and the message management computer device is arranged to be located within a gateway, the participant servers, gateway and matching order engine being in communication with each other via a communications network.

11. The system as claimed in claim 10, wherein the received message comprises an order message.

12. The system as claimed in claim 11, wherein the second category of message type comprises a new order message or an amendment order message.

13. The system as claimed in claim 11, wherein the first category of message type comprises a cancellation message.

14. The system as claimed in claim 10, wherein in the event that a further message is received from a participant server that has previously sent a message, the second processor is arranged to delay the further message from the participant server until the previous message has been transmitted to the message processing device.

15. The system as claimed in claim 14, wherein the first processor is arranged to sort received messages in dependence on the identity of the sending participant server.

16. A computer-implemented method for processing messages in a computer system in order to compensate for latency delays, the computer system comprising an input, a message management computer device coupled to the input and comprising first and second processors, and first and second outputs arranged to output messages to a message processing device, the method comprising:
    receiving, at the input, messages from a plurality of server devices; and
    sorting, by the first processor, the received messages into a first category of message type that do not require compensation for latency effects and a second category of message type that does require compensation for latency effects;
    wherein for each received message, the method comprises:
    determining, by the first processor, the category of message type; and
    (i) in the event that the received message is determined to be in the first category, transmitting, by the first processor, the received message to the message processing device via the first output; and
    (ii) in the event that the received message is determined to be in the second category:
        transmitting the received message to the second processor;
        calculating, by the second processor, a randomised delay period;
        holding, by the second processor, the received message for the calculated delay period; and
        transmitting, by the second processor via the second output, the received message to the message processing device at the end of the delay period.

17. A non-transitory computer readable storage medium comprising computer readable instructions for a computer system to process messages to compensate for latency delays, the computer system comprising an input, a message management computer device coupled to the input and comprising first and second processors, and first and second outputs arranged to output messages to a message processing device, the program causing the computer system to perform the steps of:
    receiving, at the input, messages from a plurality of server devices; and
    sorting, by the first processor, the received messages into a first category of message type that do not require compensation for latency effects and a second category of message type that does require compensation for latency effects;
    wherein for each received message, the program causes the computer to perform the steps of:
    determining, by the first processor, the category of message type; and
    (i) in the event that the received message is determined to be in the first category, transmitting, by the first processor, the received message to the message processing device via the first output; and
    (ii) in the event that the receiving message is determined to be in the second category;
        transmitting the received message to the second processor;
        calculating, by the second processor, a randomised delay period;
        holding, by the second processor, the received message for the calculated delay period; and
        transmitting, by the second processor via the second output, the received message to the message processing device at the end of the delay period.

* * * * *